(12) United States Patent
Xu et al.

(10) Patent No.: US 10,983,383 B2
(45) Date of Patent: Apr. 20, 2021

(54) OPTICAL FILM, COLOR FILTER SUBSTRATE, MANUFACTURING METHODS THEREOF, AND DISPLAY DEVICES

(71) Applicants: BOE Technology Group Co., Ltd., Beijing (CN); Hefei BOE Optoelectronics Technology Co., Ltd., Hefei (CN)

(72) Inventors: Jun Xu, Beijing (CN); Qing Zhang, Beijing (CN)

(73) Assignees: BOE TECHNOLOGY GROUP CO., LTD., Beijing (CN); HEFEI BOE OPTOELECTRONICS TECHNOLOGY CO., LTD., Hefei (CN)

( * ) Notice: Subject to any disclaimer, the term of this patent is extended or adjusted under 35 U.S.C. 154(b) by 0 days.

(21) Appl. No.: 15/764,470

(22) PCT Filed: Sep. 19, 2017

(86) PCT No.: PCT/CN2017/102025
§ 371 (c)(1),
(2) Date: Mar. 29, 2018

(87) PCT Pub. No.: WO2018/153069
PCT Pub. Date: Aug. 30, 2018

(65) Prior Publication Data
US 2020/0285100 A1   Sep. 10, 2020

(30) Foreign Application Priority Data

Feb. 27, 2017 (CN) .......................... 201710107788.X

(51) Int. Cl.
*G02F 1/1335* (2006.01)
*G02B 5/02* (2006.01)
(52) U.S. Cl.
CPC ..... *G02F 1/133504* (2013.01); *G02B 5/0215* (2013.01); *G02F 1/133516* (2013.01);
(Continued)
(58) Field of Classification Search
CPC ......... G02F 1/133504; G02F 1/133516; G02F 2001/133521; G02F 2001/133562; G02B 5/0215
See application file for complete search history.

(56) References Cited

U.S. PATENT DOCUMENTS

| 2009/0310064 | A1* | 12/2009 | Choe ................ G02B 5/0263 349/64 |
| 2011/0122599 | A1* | 5/2011 | Lin .................... G02B 5/0242 362/97.1 |

(Continued)

FOREIGN PATENT DOCUMENTS

| CN | 202443141 U | 9/2012 |
| CN | 103062705 A | 4/2013 |

(Continued)

OTHER PUBLICATIONS

International Search Report and Written Opinion for PCT Application PCT/CN2017/102025 dated Dec. 22, 2017.

(Continued)

*Primary Examiner* — Nathanael R Briggs
(74) *Attorney, Agent, or Firm* — Fay Sharpe LLP

(57) ABSTRACT

An optical film, a color filter substrate, manufacturing methods thereof and display devices are provided, in the field of liquid crystal display technology. The color filter substrate includes a base, a color resistant layer and a diffusion layer. The color resistant layer and the diffusion layer are arranged on the base, and the color resistant layer and the base are arranged at the same side of the diffusion layer. The color resistant layer comprises a plurality of color (Continued)

resistant blocks which are arranged in an array. The diffusion layer comprises a plurality of diffusion structures which are arranged to be in one-to-one correspondence to the plurality of color resistant blocks. Each of the plurality of diffusion structures is configured to diffuse light vertically emitted from the color filter substrate.

20 Claims, 15 Drawing Sheets

(52) U.S. Cl.
CPC ............ *G02F 2001/133521* (2013.01); *G02F 2001/133562* (2013.01)

(56) References Cited

U.S. PATENT DOCUMENTS

2014/0118823 A1 5/2014 Feng et al.
2014/0168999 A1 6/2014 Li et al.
2015/0253623 A1 9/2015 Lee et al.
2016/0202395 A1* 7/2016 Lee .................... G02B 5/0215
362/97.1

FOREIGN PATENT DOCUMENTS

| CN | 104896363 A | 9/2015 |
| CN | 106773267 A | 5/2017 |
| JP | 2007171539 A | 7/2007 |
| JP | 2009162843 A | 7/2009 |
| KR | 20150105517 A | 9/2015 |
| WO | WO2013123887 A1 | 8/2013 |

OTHER PUBLICATIONS

Chinese Office Action for Chinese Application No. 201710107788.X dated Mar. 15, 2018.

* cited by examiner

US 10,983,383 B2

OPTICAL FILM, COLOR FILTER SUBSTRATE, MANUFACTURING METHODS THEREOF, AND DISPLAY DEVICES

This application is a 371 of PCT Patent Application No. PCT/CN2017/101419 filed Sep. 12, 2017, which claims priority to Chinese Patent Application No. 201710107788.X, filed with the State Intellectual Property Office on Feb. 27, 2017 and titled "OPTICAL FILM, COLOR FILTER SUBSTRATE, MANUFACTURING METHODS THEREOF, AND DISPLAY DEVICES," the entire contents of which are incorporated herein by reference.

TECHNICAL FIELD

The present disclosure relates to the technical field of photoelectron, and in particular, to an optical film, a color filter substrate, manufacturing methods thereof, and display devices.

BACKGROUND

A liquid crystal display has become a widely used display device owing to its numerous advantages. A liquid crystal display mainly comprises a liquid crystal display panel and a backlight module, wherein the liquid crystal display panel generally comprises an array substrate, a color filter substrate, and a liquid crystal layer arranged between the array substrate and the color filter substrate.

In the existing liquid crystal display, the light emitted from the backlight module is generally divergent. When a viewer looks directly at the liquid crystal panel, the line of sight is vertical to the panel. In this case, the light received by the viewer's eyes is the light vertically incident on the liquid crystal layer in the backlight module, and the viewer can clearly see a picture on the panel. When the viewer looks obliquely at the liquid crystal panel, the line of sight is tilted relative to the panel. In this case, the light received by the viewer's eyes is the light obliquely incident on the liquid crystal layer in the backlight module. Since the refractive indexes of liquid crystal molecules in different directions are different, there is an optical path difference when light passes through the liquid crystal layer vertically and passes through the liquid crystal layer obliquely. Therefore, the refraction angles of the liquid crystal layer to the light are also different, so that the contrast of the picture seen by the viewer deteriorates and even the color shift occurs. In addition, the larger the visible angle is, the worse the contrast is, and the more serious the color shift is.

SUMMARY

The present disclosure provides an optical film, a color filter substrate, manufacturing methods thereof, and display devices, capable of increasing the visible angle or lessening the color shift of the liquid crystal display. The technical solutions are as follows:

In a first aspect, the embodiments of the present disclosure provide an optical film. The optical film includes a base material layer and a diffusion layer. The base material layer has a first surface and a second surface opposing the first surface. The diffusion layer is arranged on the second surface of the base material layer and includes a plurality of diffusion structures which are arranged in an array. Each of the plurality of diffusion structures is configured to diffuse light from the first surface of the base material layer.

In some embodiments, each of the plurality of the diffusion structures includes a first diffusion structure and a second diffusion structure covering the first diffusion structure. The refractive index of the second diffusion structure is greater than the refractive index of the first diffusion structure.

In some embodiments, each of the plurality of first diffusion structures has a first surface being attached to the base material layer, and a second surface being away from the base material layer. The first surface of the first diffusion structure is circular and the second surface of the first diffusion structure is a convex surface.

Further, the second surface of the first diffusion structure is a semispherical surface.

In some embodiments, there are a plurality of second diffusion structures. Each of the plurality of second diffusion structures is arranged to be in one-to-one correspondence to the plurality of first diffusion structures and are configured to enable the intensity of light emitted from the second diffusion structures to be in a Lambert cosine distribution.

In some embodiments, the first diffusion structures and the second diffusion structures are made of different materials selected from any one of the following materials: niobium pentoxide, silicon dioxide, acrylic resin or epoxy resin, respectively.

In another aspect, the embodiments of the present disclosure provide a color filter substrate. The color filter substrate includes a base, a color resistant layer and a diffusion layer. The color resistant layer and the diffusion layer are located at two sides of the base respectively; or, the color resistant layer is arranged between the base and the diffusion layer. The color resistant layer comprises a plurality of color resistant blocks which are arranged in an array. The diffusion layer comprises a plurality of diffusion structures which are arranged to be in one-to-one correspondence to the plurality of color resistant blocks. Each of the plurality of diffusion structures is configured to diffuse light vertically emitted from the base.

In some embodiments, each of the plurality of the diffusion structures includes a first diffusion structure and a second diffusion structure covering the first diffusion structure. The refractive index of the second diffusion structure is greater than the refractive index of the first diffusion structure.

In some embodiments, the orthographic projection of each of the color resistant blocks on the base is located in the orthographic projection of the corresponding first diffusion structure on the base.

In some embodiments, each of the plurality of first diffusion structures has a first surface arranged close to the base and a second surface away from the base. The first surface of the first diffusion structure is circular and the second surface of the first diffusion structure is a convex surface.

In some embodiments, the second surface of the first diffusion structure is a semispherical surface.

Further, there are a plurality of second diffusion structures. Each of the plurality of second diffusion structures is arranged to be in one-to-one correspondence to the plurality of first diffusion structures and are configured to enable the intensity of light emitted from the second diffusion structures to be in a Lambert cosine distribution.

In some embodiments, the first diffusion structures and the second diffusion structures are made of different materials selected from any one of the following materials: niobium pentoxide, silicon dioxide, acrylic resin or epoxy resin, respectively.

In yet another aspect, the embodiments of the present disclosure further provide a display device. The display device includes a display panel, an optimal film arranged at a light emergent side of the display panel, and a backlight module arranged at a light incident side of the display panel and configured to provide parallel light. The emergent direction of the parallel light is vertical to the display panel. The optical film is the optical film described above.

In yet another aspect, the embodiments of the present disclosure further provide a display device. The display device includes a display panel and a backlight module that is configured to provide parallel light. The display panel includes a color filter substrate and an array substrate which are arranged in a box aligning manner, and a liquid crystal layer clamped between the color filter substrate and the array substrate. The emergent direction of the parallel light is vertical to the display panel. The color filter substrate is the color filter substrate described above.

In yet another aspect, the embodiments of the present disclosure further provide a method for manufacturing a color filter substrate. The method includes: providing a base; forming a color resistant layer on one side of the base, wherein the color resistant layer comprises a plurality of color resistant blocks; and forming a diffusion layer on the other side of the base or on the color resistant layer, where the diffusion layer comprises a plurality of diffusion structures which are arranged to be in one-to-one correspondence to the plurality of color resistant blocks, and each of the plurality of diffusion structures is configured to diffuse light vertically emitted from the base.

In yet another aspect, the embodiments of the present disclosure further provide a method for manufacturing an optical film. The method includes: providing a base material layer which has a first surface and a second surface opposing the first surface; and forming a diffusion layer on the second surface of the base material layer, where the diffusion layer comprises a plurality of diffusion structures, and each of the plurality of diffusion structures is configured to diffuse light from the first substrate of the base material layer.

The technical solutions provided by the present disclosure may include the following advantageous benefits: a diffusion layer is arranged at the light emergent side of the base and the diffusion layer comprises a plurality of transparent diffusion structures which are arranged to be in one-to-one correspondence to the color resistant blocks of the color resistant layer. Light passing through the color resistant blocks is diffused to a larger angle range by the diffusion structures, and therefore the visible angle of the liquid crystal display is increased. The display panel with the color filter substrate may use a backlight module that provides parallel light. Since the backlight module provides parallel light, all of the light vertically penetrates through the liquid crystal layer when the parallel light emergent from the backlight module is vertically incident on the display panel. The light is diffused by the diffusion structures at the corresponding position after passing through the color resistant blocks at the corresponding position, and the colors of the light diffused by the same diffusion structure to various directions are the same. Therefore, the colors of the light observed by the viewer from any position are also the same, such that the phenomenon of color shift can be avoided, thereby saving an optical compensation film and reducing the cost.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION OF THE EMBODIMENTS

In order to make the objectives, technical solutions and advantages of the present disclosure clearer, the embodiments of the present disclosure are further described in detail below with reference to the accompanying drawings.

Figure 1:
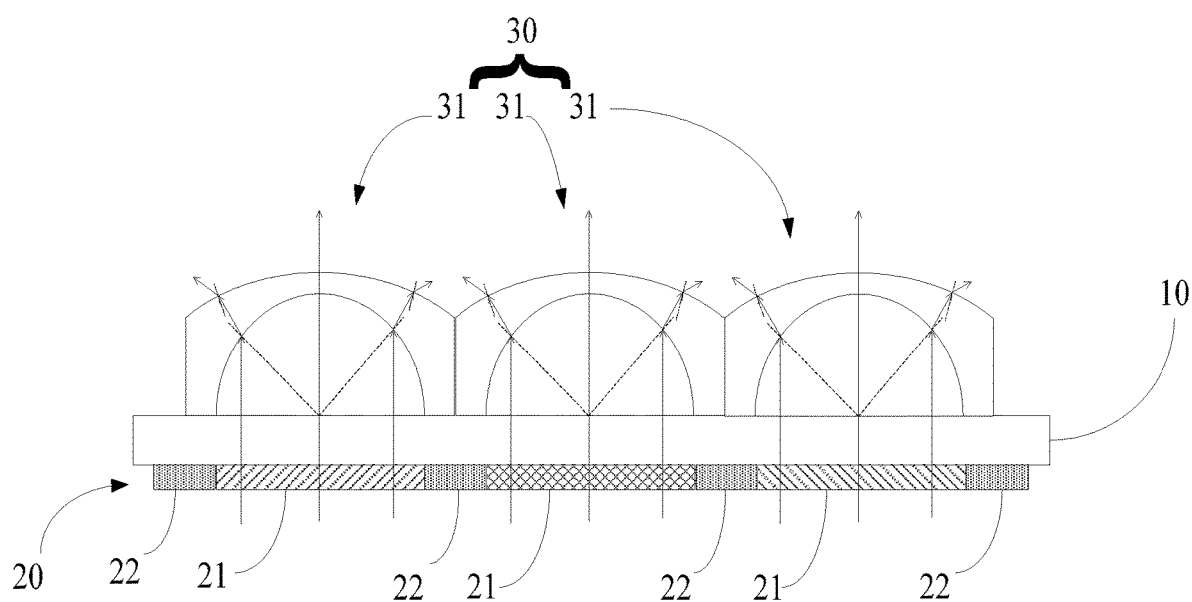
FIG. 1 is a structural schematic view of a color filter substrate provided in an embodiment of the present disclosure.

FIG. 1 is a structural schematic drawing of a color filter substrate provided by an embodiment of the present disclosure. As shown in FIG. 1, the color filter substrate comprises a base 10, a color resistant layer 20 and a diffusion layer 30. The color resistant layer 20 and the diffusion layer 30 are arranged on the base 10 and located at two sides of the base 10 respectively. The color resistant layer 20 comprises a plurality of color resistant blocks 21 which are arranged in an array. The diffusion layer 30 comprises a plurality of diffusion structures 31 which are arranged to be in one-to-one correspondence to the plurality of color resistant blocks 21. Each of the plurality of diffusion structures 31 is configured to diffuse light vertically emitted from the base 10.

Each of the plurality of diffusion structures 31 being configured to diffuse the light vertically emitted from the base 10 means that each of the plurality of diffusion structures 31 may diffuse light vertically emitted from a certain region of the base 10, where the region is located within the range of the orthographic projection of the diffusion structure 31 on the base 10.

The diffusion layer is arranged at the light emergent side of the base and the diffusion layer comprises a plurality of transparent diffusion structures which are arranged to be in one-to-one correspondence to the color resistant blocks of the color resistant layer. Light passing through the color resistant blocks is diffused to a larger angle range by the diffusion structures, and therefore the visible angle of the liquid crystal display is increased. The display panel with the color filter substrate may use a backlight module that provides parallel light. Since the backlight module provides parallel light, all of the light vertically penetrates through the liquid crystal layer when the parallel light emitted from the backlight module is vertically incident on the display panel. The light is diffused by the diffusion structures at the corresponding position after passing through the color resistant blocks at the corresponding position, and the colors of the light diffused by the same diffusion structure to various directions are the same. Therefore, the colors of the light observed by the viewer from any position are also the same, such that the phenomenon of color shift can be avoided, thereby saving an optical compensation film and reducing the cost.

During implementation, the base 10 may be a transparent substrate which is made of a relatively firm light-guiding and nonmetal material, such as glass, quartz and transparent resin.

In other embodiments, the color resistant layer may also be arranged between the base and the diffusion layer.

As shown in FIG. 1, black matrixes 22 are also arranged on the base 10 and each black matrix 22 is located between adjacent color resistant blocks 21.

Figure 2:
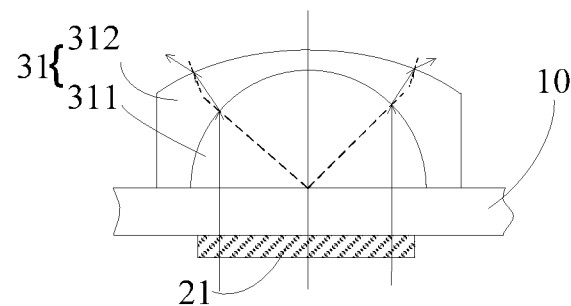
FIG. 2 is an enlarged view of a diffusion structure provided in an embodiment of the present disclosure.

FIG. 2 is an enlarged view of a diffusion structure provided in an embodiment of the present disclosure. As shown in FIG. 2, the diffusion structure 31 includes a first diffusion structure 311 and a second diffusion structure 312 covering the first diffusion structure 311. The refractive index of the second diffusion structure 312 is greater than the refractive index of the first diffusion structure 311 such that light can be diffused when passing through the second diffusion structures 5312, thereby increasing the visible angle of the display panel.

Each of the plurality of first diffusion structures 311 has a first surface close to the base 10, and a second surface away from the base 10. The first surface of the first diffusion structure 311 is circular, and the second surface of the first diffusion structure 311 is a convex surface. When light passes through a certain color resistant block 21 in the color resistant layer and irradiates the first diffusion structure 311 corresponding to the color resistant block 21, the light will vertically irradiate the first surface of the first diffusion structure 311 and enters the first diffusion structure 311. Parallel light is refracted at the second surface of the first diffusion structure 311 when passing through the first diffusion structure 311. Since the second surface of the first diffusion structure 311 is a convex surface, an acute angle between the light and a straight line vertical to the first surface of first diffusion structure 311 increases, such that the light diffuses into a larger angle range, thereby increasing the visible angle of the liquid crystal display.

Figure 3:
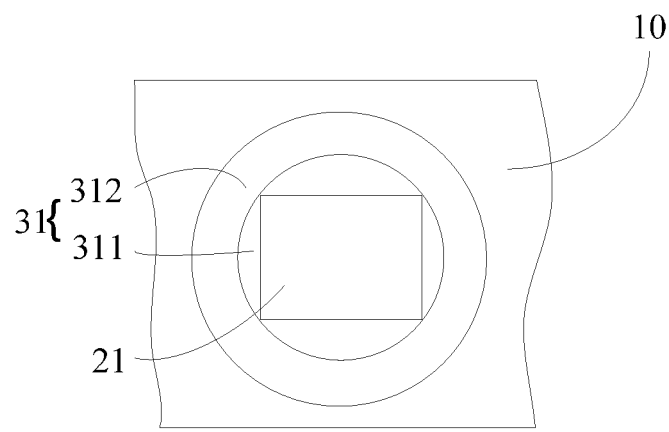
FIG. 3 is a top view of FIG. 2.

FIG. 3 is a top view of FIG. 2. Referring to FIG. 2 and FIG. 3, the orthographic projection of each color resistant block 21 on the base 10 is located within the orthographic projection of the corresponding first diffusion structure 311 on the base 10. Therefore, all of the light that passes through the color resistant blocks 21 can enter the corresponding diffusion structures 31.

In some embodiments, the orthographic projection of each color resistant block 21 on the base 10 is inscribed in the orthographic projection of the corresponding first diffusion structure 311 on the base 10 such that the size of the first diffusion structure 311 can be reduced while ensuring that all of the light that passes through each color resistant block 21 can fully enter the corresponding first diffusion structure 311.

During implementation, the thickness of the first diffusion structure 311 is gradually reduced from the middle to the edge, such that the second surface of the first diffusion structure 311 is a convex surface.

In some embodiments, the second surface of the first diffusion structure 311 is a spherical crown surface on which curvatures of various positions are consistent, thereby facilitating processing.

In some embodiments, the second surface of the first diffusion structure 311 is a semispherical surface. Since the second surface of the first diffusion structure 311 is a semispherical surface, the diffusion effect of the first diffusion structure 311 on light can be enhanced, such that light can be diffused to a larger angle range while entering the second diffusion structure 312, thereby further increasing the visible angle of the liquid crystal display.

In some embodiments, a plurality of second diffusion structures 312 are arranged to be in one-one-to correspondence to the plurality of first diffusion structures. The one-to-one correspondence between the plurality of second diffusion structures 312 and the plurality of first diffusion structures can facilitate the design of the shape of the second diffusion structures 312.

Further, the second diffusion structures are configured to enable the intensity of light emitted from the second diffusion structures 312 to be in a Lambert cosine distribution. The Lambert cosine distribution refers to the cosine variation of the radiation intensity in a direction along with an included angle between the direction and a surface normal, and expressed as the same perceived brightness when viewed from different directions. Each of the plurality of second diffusion structures 312 has a first surface and a second surface away from the first surface of the second diffusion structure 312. The first surface of the second diffusion structure 312 covers the second surface of the first diffusion structure 311 corresponding to the second diffusion structure 312. That is, the orthographic projection of the second diffusion structure 312 on the base overlaps the orthographic projection of the first diffusion structure 311 corresponding to the second diffusion structure 312 on the base. When light enters the second diffusion structure 312 after being diffused by the first diffusion structure 312, and then is refracted at the second surface of the second diffusion structure 312, the light intensity is in the Lambert cosine distribution after the light is refracted out from the second surface of the second diffusion structure 312. Therefore, when the light enters the viewer's eyes at different angular positions, the viewer sees the same brightness at each position.

It is easily derived that one surface of the second diffusion structure 312 that is away from the first diffusion structure 311 may also be a plane.

Figure 4:
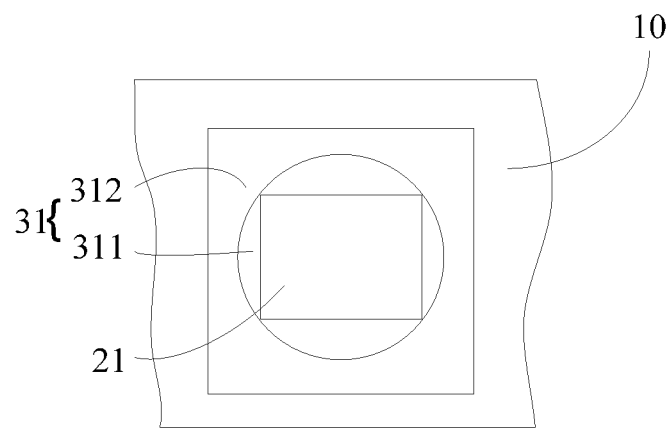
FIG. 4 is a top view of another diffusion structure provided in an embodiment of the present disclosure.

FIG. 4 is a top view of another diffusion structure provided by an embodiment of the present disclosure. As shown in FIG. 4, the orthographic projection of the second diffusion structure 312 on the base 10 may also be of a polygon, such as a rectangle.

Figure 5:
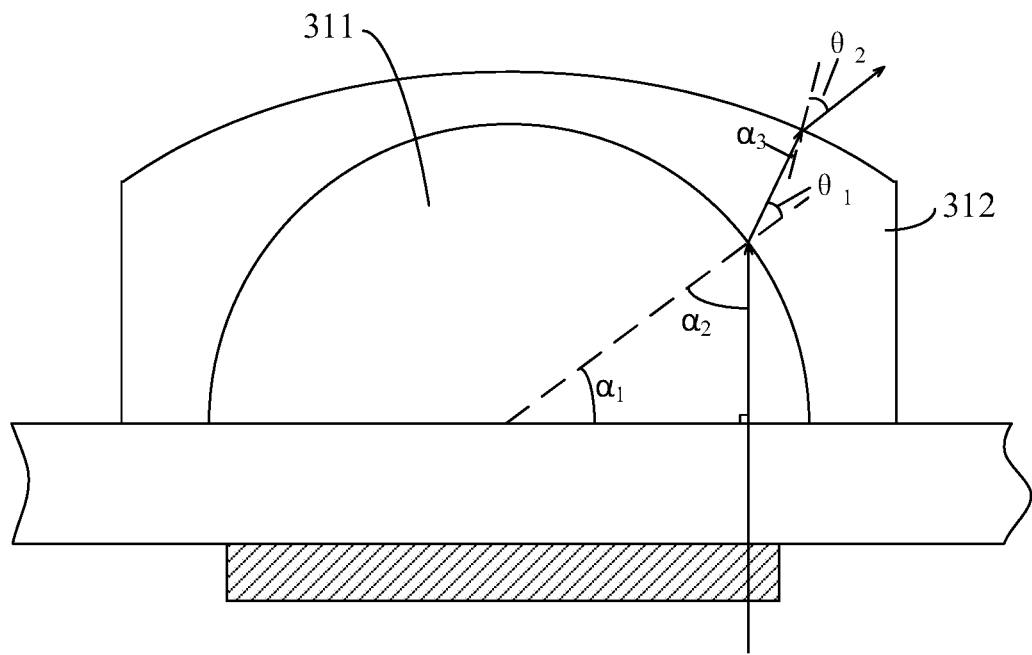
FIG. 5 is an enlarged view of FIG. 2.

FIG. 5 is an enlarged schematic drawing of FIG. 2. In FIG. 5, one dotted line is a normal of the second surface of the first diffusion structure 311, and the other dotted line is a normal of the second surface of the second diffusion structure 312. The first diffusion structure and the second diffusion structure in the same diffusion structure satisfy the following equation: $\theta_2=\theta_1+\alpha_3$, wherein, when any one of the light passes through the second surface of the first diffusion structure 311 and the second surface of the second diffusion structure 312 in sequence, the emergence angle of the light on the surface of the first diffusion structure 311 is $\theta_1$, the emergence angle of the light on the surface of the second diffusion structure 312 is $\theta_2$, and the incident angle of the light on the second surface of the second diffusion structure 312 is $\alpha_3$. Therefore, the light emitted from the surface of the second diffusion structure 312 is parallel to a normal for which a refraction of the light is occurred at an interface between the first diffusion structure 311 and the second diffusion structure 312, such that the light is in the Lambert cosine distribution.

As shown in FIG. 5, when the light is refracted at the interface between the first diffusion structure 311 and the second diffusion structure 312, it follows the law of refraction and satisfies the equation: $n_1 \cdot \sin \alpha_2 = n_2 \cdot \sin \theta_1$;

when the light is refracted at the interface between the second diffusion structure 312 and air, it follows the law of refraction and satisfies the equation:

$$n_2 \cdot \sin \alpha_3 = n_0 \cdot \sin \theta_2,$$

wherein, $n_1$ is the refractive index of the first diffusion structure 311, $n_2$ is the refractive index of the second diffusion structure 312, $n_0$ is the refractive index of air, and $n_0 \approx 1$.

In addition, $\alpha_1 + \alpha_2 = 90°$, wherein $\alpha_1$ is an included angle between the second surface of the base 10, and a connecting line of the emergence point of the light on the second surface of the first diffusion structure 311 and the circle center of the orthographic projection of the first diffusion structure 311 on the base 10, and $\alpha_2$ is the incident angle of the light on the second surface of the first diffusion structure 311.

The sum of the included angle $\theta_1$ and the included angle $\alpha_3$ is equal to the included angle $\theta_2$, which can ensure that the refractive index of the first diffusion structure 311 and the refractive index of the second diffusion structure 312 and the shape of the second surface of the second diffusion structure 312 may satisfy the condition of the Lambert cosine distribution.

During implementation, the first diffusion structure 311 and the second diffusion structure 312 may be made of different materials.

Exemplarily, the first diffusion structure 311 can be made of any one of the following materials: niobium pentoxide, silicon dioxide, acrylic resin or epoxy resin. In addition, the second diffusion structure 312 can be made of any one of the following materials: niobium pentoxide, silicon dioxide, acrylic resin, or epoxy resin.

The acrylic resin may be polymethylmethacrylate.

When selecting the materials of the first diffusion structure 311 and the second diffusion structure 312, it is necessary to ensure that the refractive index of the first diffusion structure 311 should be smaller than the refractive index of the second diffusion structure 312, such that the diffusion structure 31 can diffuse light.

Figure 6:
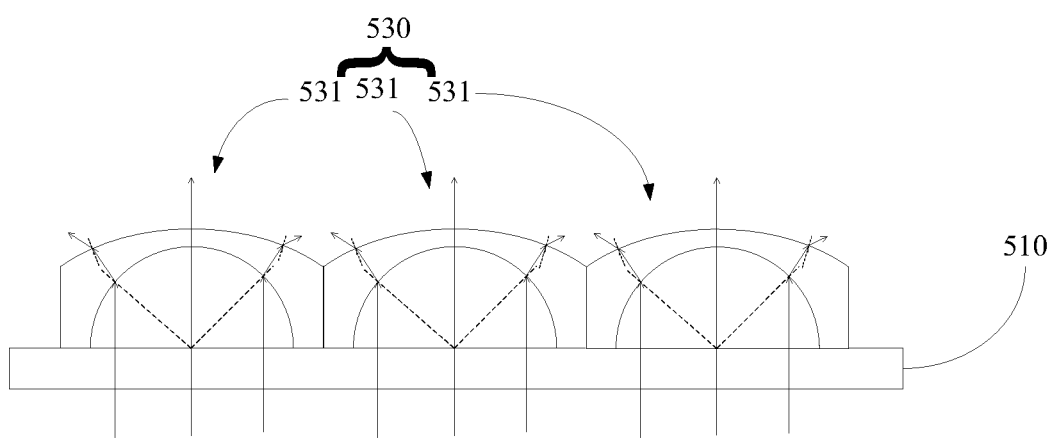
FIG. 6 is a structural schematic view of an optical film provided in an embodiment of the present disclosure.

FIG. 6 is a structural schematic drawing of an optical film provided by an embodiment of the present application. As shown in FIG. 6, the optical film comprises a base material layer 510 and a diffusion layer 530. The base material layer 510 has a first surface and a second surface opposing the first surface. The diffusion layer 530 is arranged on the second surface of the base material layer 510. The diffusion layer 510 comprises a plurality of diffusion structures 531 which are arranged in an array. Each of the plurality of diffusion structures 531 is configured to diffuse light from the surface of the base material layer 510.

Since the diffusion layer arranged on the second surface of the base material layer comprises a plurality of transparent diffusion structures, and light passing through the base material layer is diffused to a larger angle range by the diffusion structures, the visible angle of the display device can be increased when the optical film is arranged on the display device. The display device with the optical film may use a backlight module that provides parallel light. Since the backlight module provides parallel light, all of the light vertically penetrates through the liquid crystal layer when the parallel light emitted from the backlight module is vertically incident on the display device. The light is diffused by the diffusion structure at the corresponding position after passing through the color resistant block at the corresponding position, and the colors of the light diffused by the same diffusion structure to various directions are the same. Therefore, the colors of the light observed by the viewer from any position are also the same, such that the phenomenon of color shift can be avoided, thereby saving an optical compensation film and reducing the cost.

During implementation, the base material layer 510 can be a film layer made of a transparent material, such as a polyethylene terephthalate (PET) film or a tri-acetyl cellulose (TAC) film.

Figure 7:
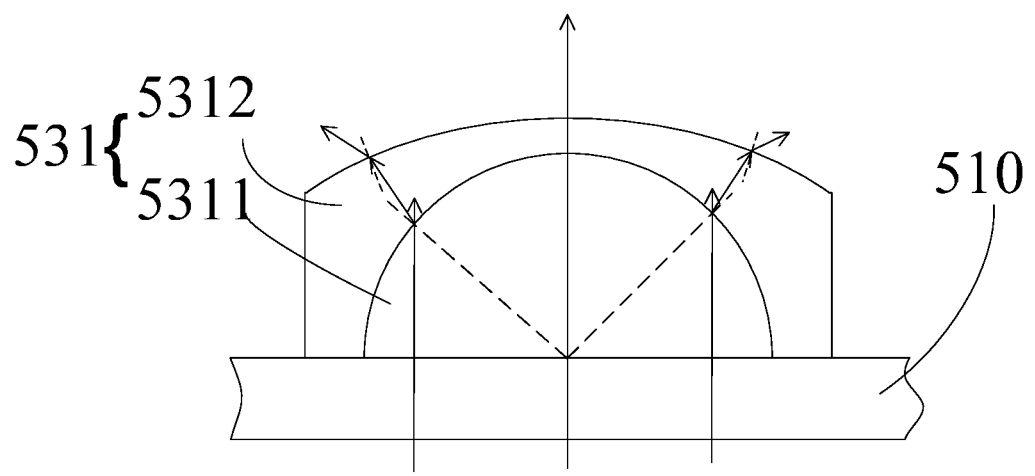
FIG. 7 is a schematic view of a diffusion structure provided in an embodiment of the present disclosure.

FIG. 7 is a schematic drawing of a diffusion structure provided by an embodiment of the present application. As shown in FIG. 7, the diffusion structure 531 comprises a first diffusion structures 5311 and a second diffusion structures 5312 covering the first diffusion structures 5311. The refractive index of the second diffusion structure 5312 is greater than the refractive index of the first diffusion structure 5311, such that light can be diffused when passing through the second diffusion structures 5312, thereby increasing the visible angle of the display device.

Each of the plurality of first diffusion structures 5311 has a first surface being attached to the base material layer 510, and a second surface away from the base material layer 510. The first surface of the first diffusion structure 5311 is circular, and the second surface of the first diffusion structure 5311 is a convex surface. When light passes through a region on the base material layer 510 and irradiates the first diffusion structure 5311 corresponding to the region, the light will vertically irradiate the first surface of the first diffusion structures 5311 and enters the first diffusion structure 5311. Parallel light is refracted at the second surface of the first diffusion structure 5311 when passing through the first diffusion structure 5311. Since the second surface of the first diffusion structure 5311 is a convex surface, the acute angle between the light and a straight line vertical to the first surface increases of the first diffusion structures 5311, such that the light diffuses into a larger angle range, thereby increasing the visible angle of the display device.

The specific structures of the first diffusion structure 5311 and the second diffusion structure 5312 may refer to the first diffusion structure and the second diffusion structure shown in FIG. 1 to FIG. 5, and details are not described herein again.

Figure 8:
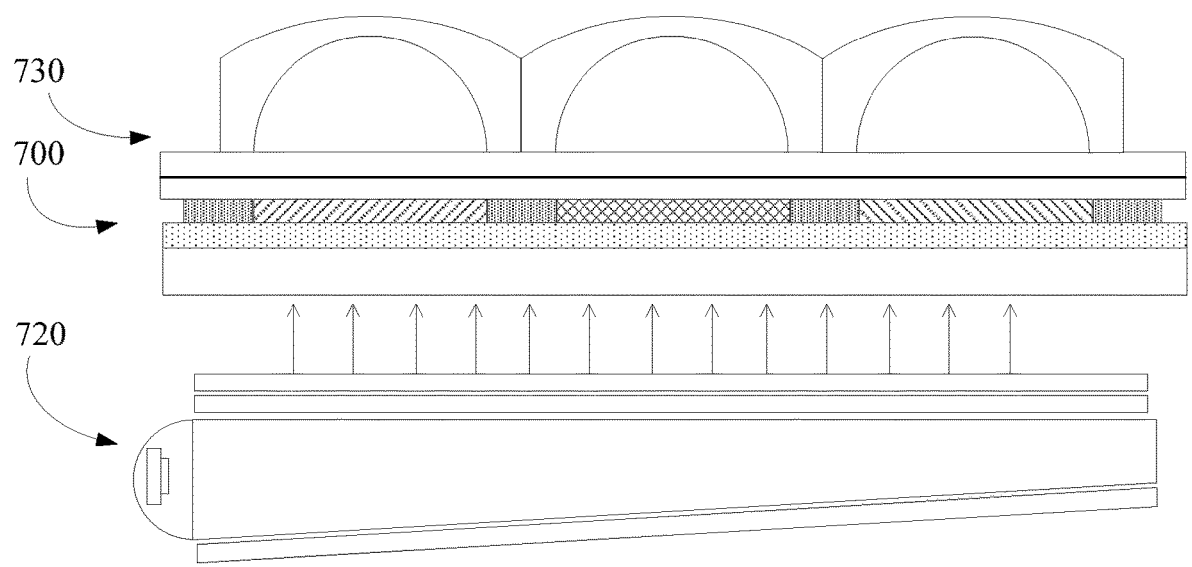
FIG. 8 is a structural schematic view of a display device provided in an embodiment of the present disclosure.

FIG. 8 is a structural schematic drawing of a display device provided in an embodiment of the present disclosure. As shown in FIG. 8, the display device includes a display panel 700, an optimal film 730 arranged at the light emergent side of the display panel 700, and a backlight module 720 arranged at the light incident side of the display panel and configured to provide parallel light. The emergent direction of the parallel light is vertical to the display panel 700. The optimal film 730 may be any optimal film described above.

An optimal film is arranged at the light emergent side of the display panel and the optimal film includes a base material layer and a diffusion layer that includes a plurality of diffusion structures. By arranging the plurality of diffusion structures to be in one-to-one correspondence to the color resistant blocks of the color resistant layer, light passing through the color resistant blocks is diffused to a larger angle range by the diffusion structures, thereby increasing the visible angle of the display device. Since the backlight module provides parallel light, all of the light vertically penetrates through the liquid crystal layer when the parallel light emitted from the backlight module is vertically incident on the display panel in the display device. The light is diffused by the diffusion structures at the corresponding position after passing through the color resistant blocks at the corresponding position, and the colors of the light diffused by the same diffusion structure to various directions are the same. Therefore, the colors of the light observed by the viewer from any position are also the same, such that the phenomenon of color shift can be avoided, thereby saving an optical compensation film and reducing the cost.

In the present embodiment, the optical film 730 may be directly pasted to the light-emergent side of the display panel 700.

Figure 9:
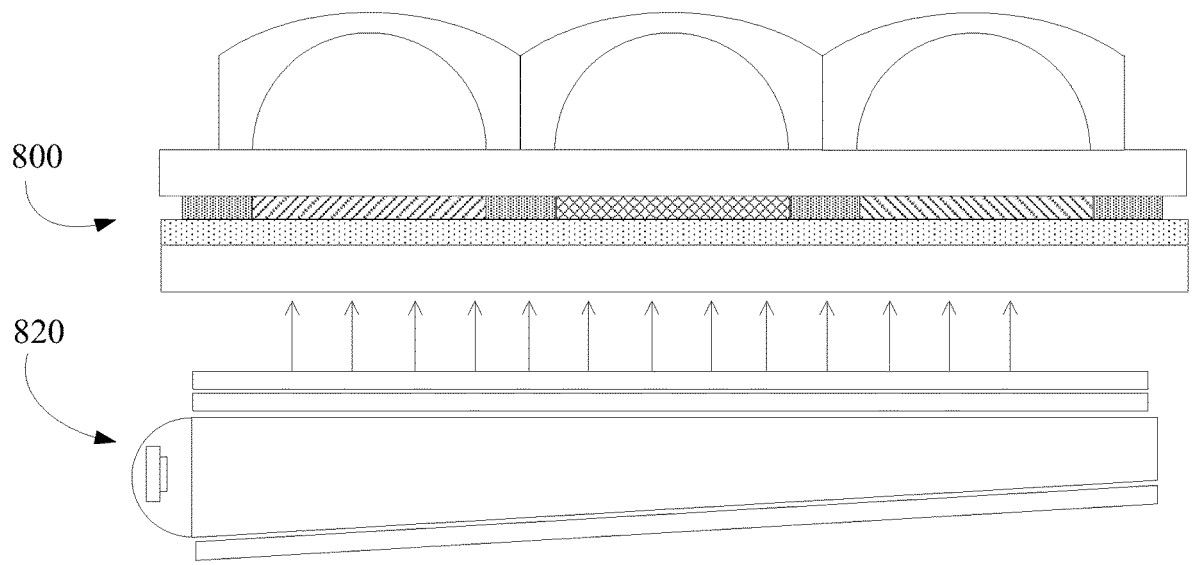
FIG. 9 is a structural schematic view of a display device provided in an embodiment of the present disclosure.
Figure 10:
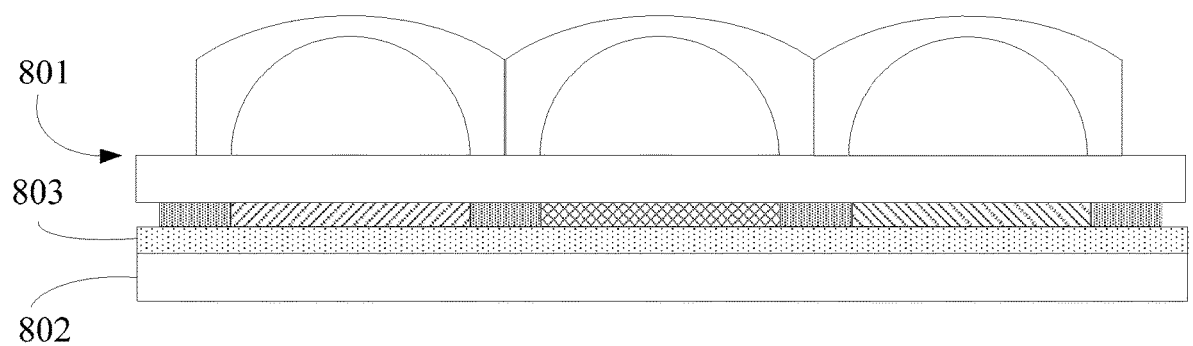
FIG. 10 is a structural schematic view of a display panel provided in an embodiment of the present disclosure.

FIG. 9 is a structural schematic drawing of a display device provided in an embodiment of the present disclosure. As shown in FIG. 9, the display device includes a display panel 800 and a backlight module 802 that provides parallel light. FIG. 10 is a structural schematic drawing of a display panel provided in an embodiment of the present disclosure. As shown in FIG. 10, the display panel 800 includes a color filter substrate and an array substrate which are arranged in a box aligning manner, and a liquid crystal layer clamped between the color filter substrate and the array substrate. The emergent direction of the parallel light is vertical to the display panel 800. The color filter substrate 801 may be any color filter substrate described above.

A diffusion layer is arranged at the light emergent side of the base and the diffusion layer includes a plurality of transparent diffusion structures. By arranging the plurality of diffusion structures to be in one-to-one correspondence to the color resistant blocks of the color resistant layer, light passing through the color resistant blocks is diffused to a larger angle range by the diffusion structures, thereby increasing the visible angle of the liquid crystal display. The liquid crystal display adopts a backlight module that provides parallel light. Since the backlight module provides the parallel light, all of the light vertically penetrates through the liquid crystal layer when the parallel light emitted from the backlight module is vertically incident on the display panel. The light is diffused by the diffusion structures at the corresponding position after passing through the color resistant blocks at the corresponding position, and the colors of the light diffused by the same diffusion structure to various directions are the same. Therefore, the colors of the light observed by the viewer from any position are also the same, such that the phenomenon of color shift can be avoided, thereby saving an optical compensation film and reducing the cost.

Compared with the backlight module that provides diffused light, a diffuser may be saved for the backlight module that provides parallel light. Therefore, the cost for manufacturing the liquid crystal display is reduced.

Figure 11:
FIG. 11 is a flow chart of a method of manufacturing a color filter substrate provided in an embodiment of the present disclosure.

FIG. 11 is a flow chart of a method for manufacturing a color filter substrate provided in an embodiment of the present disclosure. As shown in FIG. 11, the method includes the following steps.

S11: a base is provided.

S12: a color resistant layer is formed on one side of the base.

The color resistant layer comprises a plurality of color resistant blocks.

S13: a diffusion layer is formed on the other side of the base or on the color resistant layer.

The diffusion layer comprises a plurality of diffusion structures which are arranged to be in one-to-one correspondence to the plurality of color resistant blocks, and each of the plurality of diffusion structures is configured to diffuse light vertically emitted from the base.

A diffusion layer is arranged at the light emergent side of the base and the diffusion layer includes a plurality of transparent diffusion structures. By arranging the plurality of diffusion structures to be in one-to-one correspondence to the color resistant blocks in the color resistant layer, light passing through the color resistant blocks is diffused to a larger angle range by the diffusion structures, thereby increasing the visible angle of the liquid crystal display. The display panel with the color filter substrate may adopt a backlight module that provides parallel light. Since the backlight module provides the parallel light, all of the light vertically penetrates through the liquid crystal layer when the parallel light emitted from the backlight module is vertically incident on the display panel. The light is diffused by the diffusion structures at the corresponding position after passing through the color resistant blocks at the corresponding position, and the colors of the light diffused by the same diffusion structure to various directions are the same. Therefore, the colors of the light observed by the viewer from any position are also the same, such that the phenomenon of color shift can be avoided, thereby saving an optical compensation film and reducing the cost.

Figure 12:
FIG. 12 is a flow chart of another method of manufacturing a color filter substrate provided in an embodiment of the present disclosure.

FIG. 12 is a flow chart of a method for manufacturing another color filter substrate provided by an embodiment of the present disclosure. As shown in FIG. 12, the method comprises the following steps.

S21: a base is provided.

During implementation, the base may be a transparent substrate, which may be a substrate made of a relatively firm light-guiding and nonmetal material, such as glass, quartz and transparent resin.

In some embodiments, the provided base may be cleaned in advance to ensure cleanness of the base.

S22: a color resistant layer is formed on one side of the base.

The color resistant layer includes a plurality of color resistant blocks. Exemplarily, the color resistant layer may include at least one of red color resistant blocks, green color resistant blocks and blue color resistant blocks.

In general, a black matrix is further arranged on one side of the base, where the color resistant layer is arranged, and is located between adjacent color resistant blocks.

Exemplarily, step S22 further comprises:

forming the black matrix on one side of the base through a single patterning process; and forming kinds of color resistant blocks on the base on which the black matrix is formed.

Figure 13:
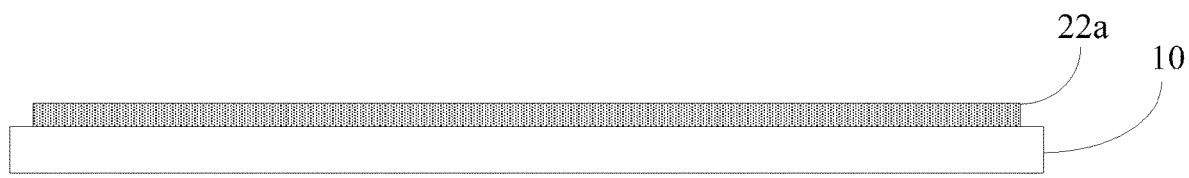
FIG. 13 is a schematic diagram of a process of manufacturing a black matrix provided in an embodiment of the present disclosure.
Figure 14:
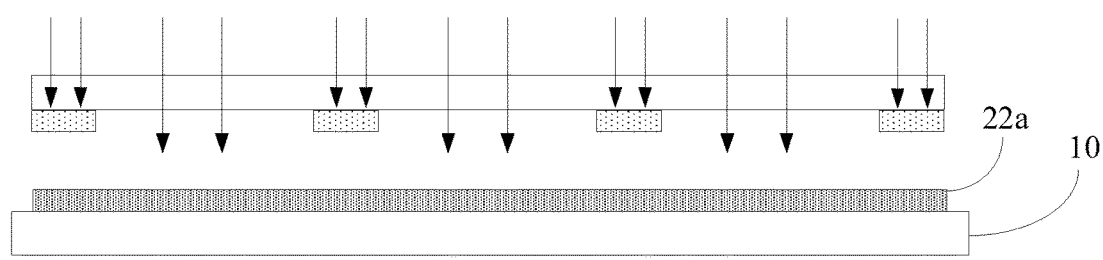
FIG. 14 is a schematic diagram of a process of manufacturing a black matrix provided in an embodiment of the present disclosure.
Figure 15:
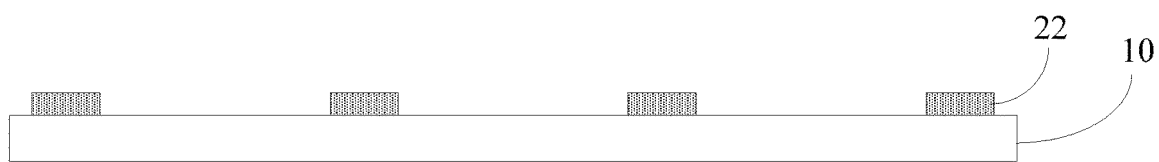
FIG. 15 is a schematic diagram of a process of manufacturing a black matrix provided in an embodiment of the present disclosure.

The process of forming the black matrix will be described in detail below with reference to FIGS. 13 to 15. First, as shown in FIG. 13, the base is coated with a black matrix material 22a. As shown in FIG. 14, the black matrix material 22a is exposed. As shown in FIG. 15, the exposed black matrix material 22a is developed to remove a part of the black matrix material 22a. Baking may also be performed after developing, such that the black matrix 22 is finally formed.

Figure 16:
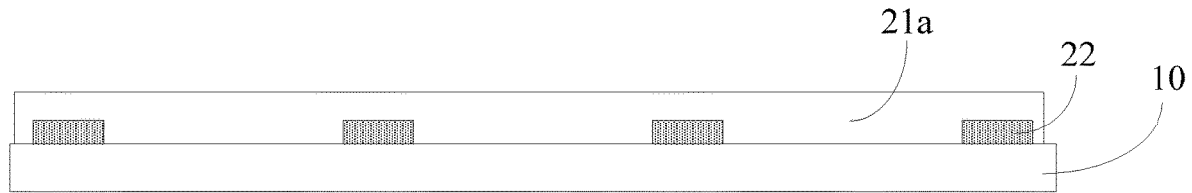
FIG. 16 is a schematic diagram of a process of manufacturing a color resistant layer provided in an embodiment of the present disclosure.
Figure 17:
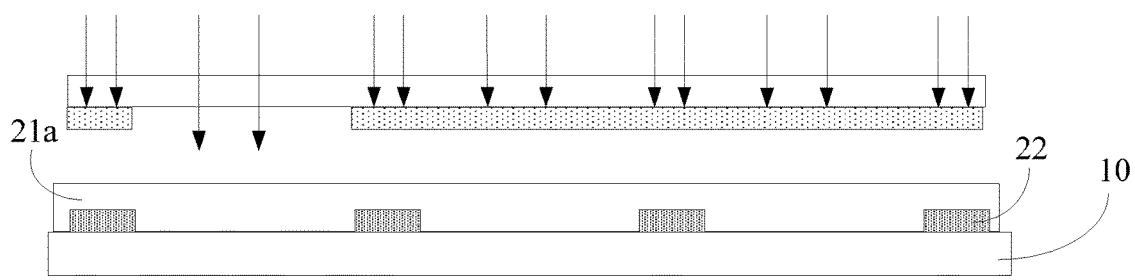
FIG. 17 is a schematic diagram of a process of manufacturing a color resistant layer provided in an embodiment of the present disclosure.
Figure 18:
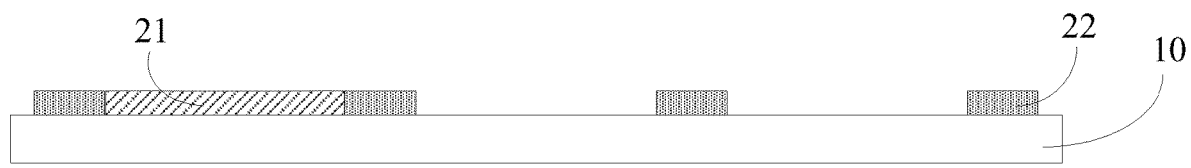
FIG. 18 is a schematic diagram of a process of manufacturing a color resistant layer provided in an embodiment of the present disclosure.

The process of forming the color resistant layer will be described in detail below with reference to FIGS. 16-18. As shown in FIG. 16, the base 10 is coated with a color resistant material 21a. As shown in FIG. 17, the color resistant material 21a is exposed. As shown in FIG. 18, the exposed color resistant material 21a is developed to remove a part of the color resistant material 21a. Baking may also be performed after developing, such that a color resistant block 21 is finally formed.

Figure 19:
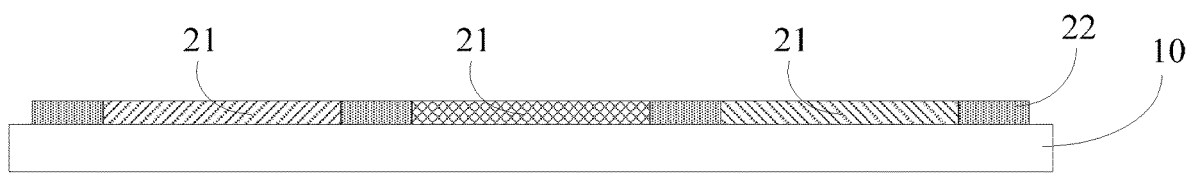
FIG. 19 is a structural schematic view of a color filter substrate provided in an embodiment of the present disclosure.

As shown in FIG. 19, by repeating the process of the color resistant block 21, a plurality of different color resistant blocks 21 are finally formed on the base. The color resistant layer can be formed by the prior art to reduce the production difficulty and save the cost.

S23: a plurality of first diffusion structures are formed on the other side of the base.

Each of the plurality of first diffusion structures has a first surface arranged close to the base, and a second surface away from the base. The first surface of the first diffusion structure is circular. The second surface of the first diffusion structure is a convex surface.

In some embodiments, the second surface of the first diffusion structure is a semispherical surface. Since the second surface is a semispherical surface, the diffusion effect of the first diffusion structure on light can be enhanced, such that the light can be diffused to a larger angle range while entering the second diffusion structure, thereby further increasing the visible angle of the liquid crystal display.

Figure 20:
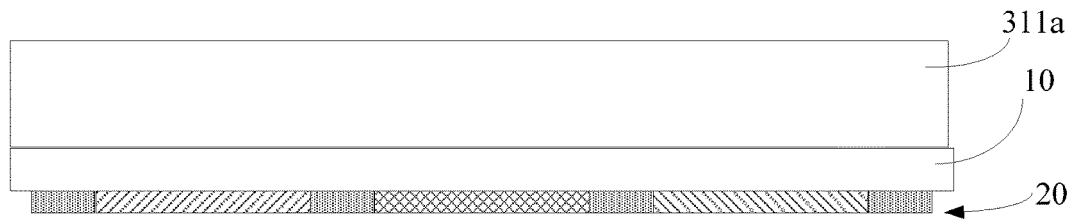
FIG. 20 is a schematic diagram of a process of forming a first diffusion structure provided in an embodiment of the present disclosure.
Figure 21:
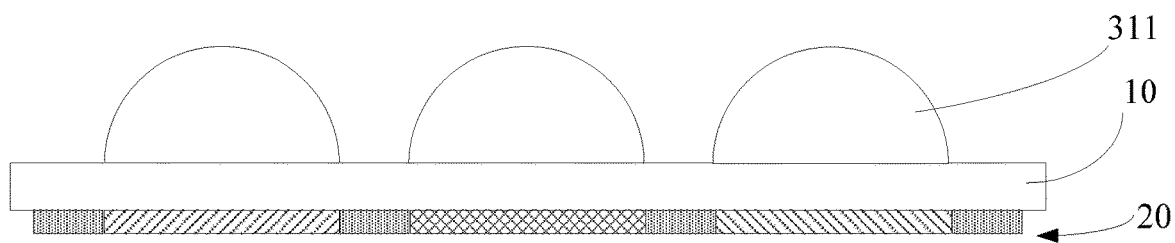
FIG. 21 is a schematic diagram of a process of forming a first diffusion structure provided in an embodiment of the present disclosure.

Exemplarily, refer to FIGS. 20 to 21, step S23 may comprise: forming a first diffusion material 311a on the other side of the base 10; and removing a part of the first diffusion material 311a to form a plurality of first diffusion structures 311.

During implementation, the first diffusion structures 311 may be formed through a patterning process. The patterning process may be a photoetching process.

The first diffusion material 311a may be formed on the base 10 in a vapor evaporation manner.

In some embodiments, the first diffusion material 311a may be made of any one of the following materials: niobium pentoxide, silicon dioxide, acrylic resin or epoxy resin.

S24: a plurality of second diffusion structures are formed on the plurality of first diffusion structures.

A plurality of second diffusion structures are arranged to be in one-to-one correspondence to the first diffusion structures and are configured to enable the intensity of light emitted from the second diffusion structures to be in a Lambert cosine distribution.

Each of the plurality of second diffusion structures has a first surface and a second surface away from the first surface of the second diffusion structure. The first surface of the second diffusion structure covers the second surface of the first diffusion structure.

Figure 22:
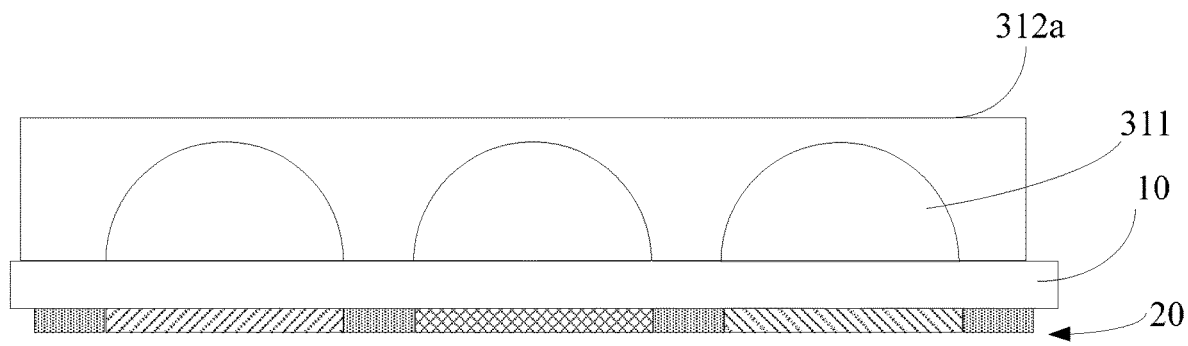
FIG. 22 is a schematic diagram of a process of forming a second diffusion structure provided in an embodiment of the present disclosure.
Figure 23:
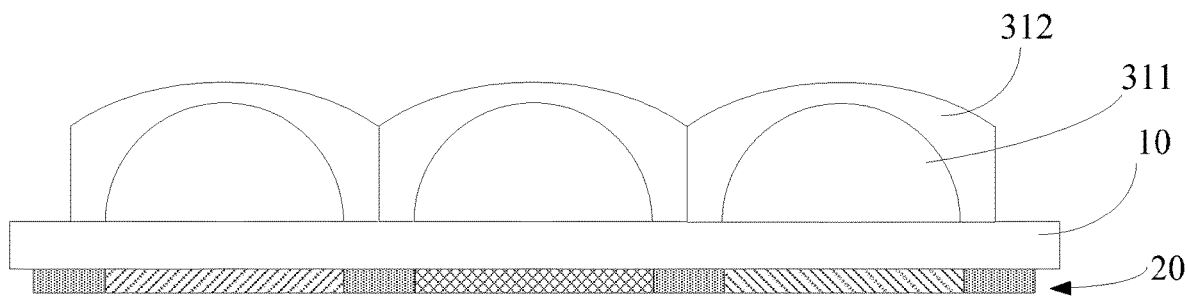
FIG. 23 is a schematic diagram of a process of forming a second diffusion structure provided in an embodiment of the present disclosure.

Further, refer to FIGS. 22 to 23, step S24 may comprise: forming a second diffusion material 312a on the side of the base 10 where the first diffusion structures are formed; and removing a part of the second diffusion material 312a to form a plurality of second diffusion structures 312.

During implementation, the second diffusion structures 312 may be formed through a patterning process. The patterning process may be a photoetching process.

In some embodiments, the second diffusion material may be made of any one of the following materials: niobium pentoxide, silicon dioxide, acrylic resin or epoxy resin.

After the second diffusion structures are formed, the first diffusion structure and the corresponding second diffusion structure satisfy the following equation:

$$\theta_2 = \theta_1 + \alpha_3,$$

wherein when any one of the light passes through the surface of the first diffusion structure and the surface of the second diffusion structure in sequence, the emergence angle of the light on the surface of the first diffusion structure is $\theta_1$, the emergence angle of the light on the surface of the second diffusion structure is $\theta_2$, and the incident angle of the light on the second surface of the second diffusion structure is $\alpha_3$. Light emitted from the surface of the second diffusion structure is parallel to the normal for which the refraction of the light is occurs at the interface between the first diffusion structure and the second diffusion structure, such that the intensity of the light emitted from the second diffusion structure is in the Lambert cosine distribution.

During manufacturing, the surface shape of the second surface of the second diffusion structure can be determined by software simulation, such that the light emitted from the second surface of the second diffusion structure satisfies the equation: $\theta_2 = \theta_1 + \alpha_3$.

After the shape of the second surface of the second diffusion structure is simulated, a mask plate corresponding to the second surface can be manufactured, and the second diffusion structure can be manufactured through a patterning process based on the mask plate.

It should be noted that although the color resistant layer and the diffusion layer are arranged on two opposite sides of the base in the embodiments shown in FIGS. 13 to 23, the color filter layer and the diffusion layer may also be arranged on the same side of the base in other embodiments, that is, the color resistant layer may also be arranged between the base and the diffusion layer.

Figure 24:
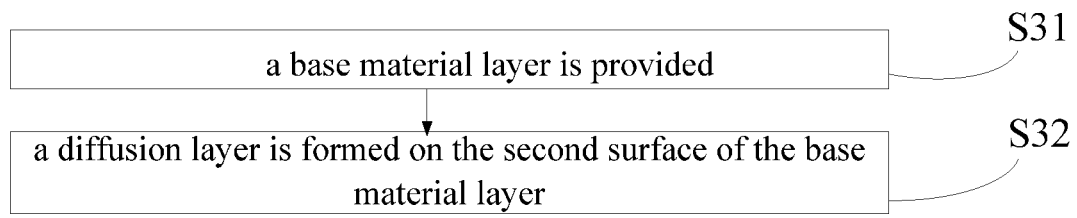
FIG. 24 is a flow chart of a method of manufacturing an optical film provided in an embodiment of the present disclosure.

FIG. 24 is a flow chart of a method for manufacturing an optical film provided in an embodiment of the present disclosure. As shown in FIG. 24, the method includes the following steps.

S31: a base material layer is provided.

The base material layer comprises a first surface and a second surface opposing the first surface.

S32: a diffusion layer is formed on the second surface of the base material layer.

Exemplarily, the diffusion layer includes a plurality of diffusion structures. Each of the plurality of diffusion structures is configured to diffuse light from the first surface of the base material layer.

A diffusion layer is arranged on the second surface of the base material layer and the diffusion layer includes a plurality of transparent diffusion structures. Light passing through the base material layer is diffused to a larger angle range by the diffusion structures, and therefore the visible angle of the display device is increased when the display device is provided with the optical film. The display panel with the optical film may adopt a backlight module that provides parallel light. Since the backlight module provides the parallel light, all of the light vertically penetrates through the liquid crystal layer when the parallel light emitted from the backlight module is vertically incident on the display device. The light is diffused by the diffusion structures at the corresponding position after passing through the color resistant blocks at the corresponding position, and the colors of the light diffused by the same diffusion structure to various directions are the same. Therefore, the colors of the light observed by the viewer from any position are also the same, such that the phenomenon of color shift can be avoided, thereby saving an optical compensation film and reducing the cost.

In step S32, the process of forming the diffusion layer on the second surface of the base material layer may refer to step S23-24 and is not elaborated again here.

The foregoing are only some embodiments of the present disclosure, and are not intended to limit the present disclosure. Within the spirit and principles of the disclosure, any modifications, equivalent substitutions, improvements, etc., are within the scope of protection of the present disclosure.

What is claimed is:

1. An optical film, comprising a base material layer and a diffusion layer, wherein the base material layer has a first surface and a second surface opposing the first surface; the diffusion layer is arranged on the second surface of the base material layer and comprises a plurality of diffusion structures in an array; each of the plurality of diffusion structures is configured to diffuse light from the first surface of the base material layer,
wherein each of the plurality of diffusion structures includes a first diffusion structure and a second diffusion structure covering the first diffusion structure; an refractive index of the second diffusion structure is greater than an refractive index of the first diffusion structure, and
wherein a plurality of the second diffusion structures are arranged to be in one-to-one correspondence to a plurality of the first diffusion structures and are configured to enable the intensity of light emitted from the second diffusion structures to be in a Lambert cosine distribution.

2. The optical film according to claim 1, wherein each of the plurality of first diffusion structures has a first surface being attached to the base material layer, and a second surface being away from the base material layer; the first surface of the first diffusion structure is circular; the second surface of the first diffusion structure is a convex surface.

3. The optical film according to claim 2, wherein the second surface of the first diffusion structure is a semispherical surface.

4. The optical film according to claim 1, wherein the first diffusion structure and the second diffusion structure are made of different materials selected from at least one of the following material: niobium pentoxide, silicon dioxide, acrylic resin or epoxy resin, respectively.

5. A color filter substrate, comprising a base, a color resistant layer and a diffusion layer, wherein the color resistant layer and the diffusion layer are located at two sides of the base respectively, or, the color resistant layer is arranged between the base and the diffusion layer; the color resistant layer comprises a plurality of color resistant blocks in an array; the diffusion layer comprises a plurality of diffusion structures which is arranged to be in one-to-one correspondence to the plurality of color resistant blocks; each of the plurality of diffusion structures is configured to diffuse light substantially vertically emitted from the base,
wherein each of the plurality of the diffusion structure includes a first diffusion structure and a second diffusion structure covering the first diffusion structure; an refractive index of the second diffusion structure is greater than an refractive index of the first diffusion structure.

6. The color filter substrate according to claim 5, wherein an orthographic projection of each of the color resistant blocks on the base is located in an orthographic projection of a corresponding first diffusion structure on the base.

7. The color filter substrate according to claim 5, wherein each of the plurality of first diffusion structures has a first surface arranged close to the base, and a second surface away from the base; the first surface of the first diffusion structure is circular; the second surface of the first diffusion structure is a convex surface.

8. The color filter substrate according to claim 7, wherein the second surface of the first diffusion structure is a semispherical surface.

9. The color filter substrate according to claim 5, wherein a plurality of the second diffusion structures are arranged to be in one-to-one correspondence to a plurality of the first diffusion structures and are configured to enable the intensity of light emitted from the second diffusion structures to be in a Lambert cosine distribution.

10. The color filter substrate according to claim 5, wherein the first diffusion structure and the second diffusion structure are made of different materials selected from at least one of the following material: niobium pentoxide, silicon dioxide, acrylic resin or epoxy resin, respectively.

11. A display device, comprising a display panel, an optical film according to claim 1 arranged at a light emergent side of the display panel, and a backlight module arranged at a light incident side of the display panel for providing parallel light; an emergent direction of the parallel light is vertical to the display panel.

12. A display device, comprising a display panel and a backlight module for providing parallel light; the display panel comprises a color filter substrate and an array substrate which are arranged in a box aligning manner, and a liquid crystal layer clamped between the color filter substrate and the array substrate; an emergent direction of the parallel light is vertical to the display panel; the color filter substrate is the color filter substrate according to claim 5.

13. A manufacturing method for an optical film, comprising the following steps:
   providing a base material layer which has a first surface and a second surface opposing the first surface; and
   forming a diffusion layer on the second surface of the base material layer, wherein the diffusion layer comprises a plurality of diffusion structures, and each of the plurality of diffusion structures is configured to diffuse light vertically incident from the first substrate of the base material layer,
   wherein each of the plurality of diffusion structures includes a first diffusion structure and a second diffusion structure covering the first diffusion structure; an refractive index of the second diffusion structure is greater than an refractive index of the first diffusion structure, and
   wherein a plurality of the second diffusion structures are arranged to be in one-to-one correspondence to a plurality of the first diffusion structures and are configured to enable the intensity of light emitted from the second diffusion structures to be in a Lambert cosine distribution.

14. The optical film according to claim 1, wherein the plurality of diffusion structures are transparent.

15. The optical film according to claim 1, wherein the first diffusion structure is consisted of one material selected from niobium pentoxide, silicon dioxide, acrylic resin or epoxy resin.

16. The optical film according to claim 1, wherein the second diffusion structure is consisted of one material selected from niobium pentoxide, silicon dioxide, acrylic resin or epoxy resin.

17. The optical film according to claim 1, wherein the optical film is provided with a backlight module on the first surface of the base material layer and providing parallel light vertical to the first surface of the base material.

18. The optical film according to claim 1, wherein each of the plurality of first diffusion structures has a first surface being attached to the base material layer, and a second surface being away from the base material layer, each of the plurality of second diffusion structures has a first surface in contact with a corresponding first material layer, and a second surface being away from the first material layer,
   wherein, when a light beam vertical to the first surface of the base material passes through the first diffusion structure and the second diffusion structure in sequence, an emergence angle of the light beam at the second surface of the first diffusion structure is $\theta_1$, an emergence angle of the light beam at the second surface of the second diffusion structure is $\theta_2$, and an incident angle of the light beam at the second surface of the second diffusion structure is $\alpha_3$, the following equation is satisfied:

$$\theta_2 = \theta_1 + \alpha_3.$$

19. The optical film according to claim 1, wherein first diffusion structures and a second diffusion structures are all consisted of transparent materials.

20. The color filter substrate according to claim 5, wherein an orthographic projection of each color resistant block onto the base is inscribed in an orthographic projection of a corresponding first diffusion structure onto the base.

* * * * *

UNITED STATES PATENT AND TRADEMARK OFFICE
CERTIFICATE OF CORRECTION

| | |
|---|---|
| PATENT NO. | : 10,983,383 B2 |
| APPLICATION NO. | : 15/764470 |
| DATED | : April 20, 2021 |
| INVENTOR(S) | : Xu et al. |

It is certified that error appears in the above-identified patent and that said Letters Patent is hereby corrected as shown below:

On the Title Page

In item (22), cancel the text "Sep. 19, 2017" and insert the following:
--Sep. 18, 2017--

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*